(12) United States Patent
Law

(10) Patent No.: US 11,574,310 B2
(45) Date of Patent: Feb. 7, 2023

(54) SECURE AUTHENTICATION SYSTEM AND METHOD

(71) Applicant: Visa International Service Association, San Francisco, CA (US)

(72) Inventor: Simon Law, San Mateo, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 101 days.

(21) Appl. No.: 17/040,944

(22) PCT Filed: Aug. 16, 2018

(86) PCT No.: PCT/IB2018/056180
§ 371 (c)(1),
(2) Date: Sep. 23, 2020

(87) PCT Pub. No.: WO2019/186255
PCT Pub. Date: Oct. 3, 2019

(65) Prior Publication Data
US 2021/0035107 A1  Feb. 4, 2021

Related U.S. Application Data

(60) Provisional application No. 62/650,180, filed on Mar. 29, 2018.

(51) Int. Cl.
*G06Q 20/40* (2012.01)
*G06Q 20/38* (2012.01)

(52) U.S. Cl.
CPC ....... *G06Q 20/4016* (2013.01); *G06Q 20/386* (2020.05); *G06Q 20/388* (2013.01); *G06Q 20/3821* (2013.01); *G06Q 20/3825* (2013.01)

(58) Field of Classification Search
CPC ............................................. G06Q 20/00–425
See application file for complete search history.

(56) References Cited

U.S. PATENT DOCUMENTS 7,840,815 B2 * 11/2010 Kakehi ................. H04L 9/3247
380/37
2005/0097320 A1 * 5/2005 Golan ................. G06Q 20/4014
713/166

(Continued)

FOREIGN PATENT DOCUMENTS

WO  2016050990  7/2016

OTHER PUBLICATIONS

Bouch A., 3-D Secure: A critical review of 3-D Secure and its effectiveness in preventing card not present fraud, Royal Holloway University of London, Mar. 2011 (Year: 2011).*

(Continued)

*Primary Examiner* — John W Hayes
*Assistant Examiner* — Chenyuh Kuo
(74) *Attorney, Agent, or Firm* — Kilpatrick Townsend & Stockton LLP

(57) ABSTRACT

A method is disclosed. The method comprising: receiving, by an access control sewer via a directory sewer from an authentication requestor, an authentication request comprising an account identifier, and information regarding a prior authentication method on the account identifier and a current authentication method for the account identifier associated with a transaction; performing, by the access control server, a risk analysis for the transaction based at least in part on the information and a threshold; authenticating, by the access control server, the user of the account identifier using the information, the account identifier, and a result of the risk analysis; modifying, by the access control server, an authentication response to include an authentication indicator, and (Continued)

transmitting, by the access control sewer, the authentication response to the authentication requestor.

13 Claims, 6 Drawing Sheets

(56) References Cited

U.S. PATENT DOCUMENTS

| | | | |
|---|---|---|---|
| 2011/0196791 A1* | 8/2011 | Dominguez | G06Q 40/00 |
| | | | 705/44 |
| 2013/0218765 A1 | 8/2013 | Hammad et al. | |
| 2015/0046340 A1* | 2/2015 | Dimmick | G06Q 20/384 |
| | | | 705/72 |
| 2015/0088756 A1 | 3/2015 | Makhotin et al. | |
| 2016/0180333 A1* | 6/2016 | Leyva | G06Q 20/363 |
| | | | 705/41 |
| 2016/0210626 A1 | 7/2016 | Ortiz et al. | |
| 2017/0091772 A1 | 3/2017 | Piel et al. | |
| 2018/0025356 A1 | 1/2018 | Maheshwari et al. | |
| 2019/0197553 A1* | 6/2019 | Conway | H04L 63/0861 |
| 2019/0392450 A1* | 12/2019 | Gosset | G06Q 20/12 |

OTHER PUBLICATIONS

Application No. PCT/IB2018/056180, International Search Report and Written Opinion, dated Feb. 28, 2019, 15 pages.
Application No. EP18912396.1, Extended European Search Report, dated Apr. 29, 2021, 10 pages.

* cited by examiner

SECURE AUTHENTICATION SYSTEM AND METHOD

CROSS-REFERENCE TO RELATED APPLICATIONS

This international application claims priority to U.S. Provisional Patent Application No. 62/650,180, filed on Mar. 29, 2018, the disclosure of which is herein incorporated by reference in its entirety for all purposes.

BACKGROUND

Various systems and methods for authenticating users in online transactions exist. In some instances, an authorizing entity such as an issuer may authenticate a user conducting an online transaction with a resource provider such as a merchant. The authorizing entity can verify the user by requesting a password from the user. The user can then supply the password, and the authorizing entity can authenticate the user. After the authorizing entity authenticates the user, the authorizing entity can provide an indication of the authentication (e.g., a positive or negative authentication result) to the resource provider. The resource provider can then provide an authorization request message for the particular amount of the transaction requested by the user to the authorizing entity. The authorizing entity also receive the indication of the authentication, and can use that is its decision to authorize or not authorize the interaction.

While the above described system is suitable for many situations, a number of improvements can be made. For example, the data used to verify the user is limited to a password that we previously supplied to the authorizing entity. If that password had someone been obtained by an unauthorized user, then the unauthorized user could fraudulently perform the transaction with the resource provider. Thus, it would be desirable to provide for a system and method that provides for more effective and efficient authentication during online transactions.

Another problem with the conventional system described above is that the user is always asked for a password by the issuer. This can be cumbersome and requires a number of steps. Further, because the user may be communicating with both a resource provider such as a merchant and the issuer during a single online transaction, it is possible that communications can be hung up or may time out. Accordingly, better ways to streamline processing, by potentially removing the requirement that the user enter an issuer password would be desirable.

Embodiments of the invention address these and other problems, individually and collectively.

SUMMARY

In some embodiments of the invention, systems and methods for utilizing additional sets of attributes to conduct remote authentication processing for transactions are provided. An access control server according to embodiments of the invention can receive and analyze the attributes to aid authorizing entities such as issuers to quickly and accurately verify and authenticate online transactions. A first set of attributes may be associated with a requestor prior authentication method (prior authentication method). The second set of attributes may be associated with a requestor current authentication method (current authentication method). The requestor prior authentication method may include a level of verification that was previously performed on a primary account number (PAN) associated with a user. In some embodiments, the requestor prior authentication method may include an authentication of the user and/or a user device prior to a current transaction being conducted. A second set of attributes associated with a requestor current authentication method may include a level of authentication performed on the user during the current transaction. In some embodiments, the requestor current authentication method may include a type of authentication performed on the user during the current transaction. In accordance with at least one embodiment, the access control server may determine whether to verify a user in a transaction based on the requestor prior authentication method and/or the requestor current authentication method.

Some embodiments of the invention are directed to a method including receiving, by an access control server via a directory server from an authentication requestor, an authentication request comprising an account identifier, and information regarding a prior authentication method on the account identifier and a current authentication method for the account identifier associated with a transaction. The method may further include performing, by the access control server, a risk analysis for the transaction based at least in part on the information and a threshold. The method may further include authenticating, by the access control server, a user of the account identifier using the information, the account identifier, and a result of the risk analysis. The method may further include modifying, by the access control server, an authentication response to include an authentication indicator. The method may include transmitting, by the access control server, the authentication response to the authentication requestor.

In some embodiments, the information may further include transaction data for the transaction and personal information for the user associated with the transaction. The method may also include generating, by a service provider application associated with the account identifier, a set intent message that includes a user identifier, a service provider payment account identifier, and transaction data for the transaction. In some embodiments, the method may also include generating, by the service provider application, an attestation signature for the transaction based at least in part on input provided by the user associated with the transaction.

In some embodiments, the information regarding the prior authentication method on the account identifier and the current authentication method for the account identifier can be represented by one or more values that are appended to a message associated with the authentication request. The method may also include a value that represents a unique type of authentication provided by a processing network such as a payment processing network. In some embodiments, modifying the authentication response to include the authentication indicator comprises setting a value in the authentication response that represents a strength of a verification result for the transaction based at least in part on the prior authentication method on the account identifier and the current authentication method for the account identifier.

In some embodiments, the current authentication method for the account identifier associated with the transaction is performed by a service provider application associated with the account identifier and the transaction. The current authentication method may include at least one of a first login to an account (e.g., a cardholder account) through a service provider application (e.g., a digital wallet application) utilizing issuer authentication process (e.g., an authentication process using an online banking password or credential), a second login to the account through a service provider application authentication process (e.g., an authentication processing using a digital wallet application password), or a third login to the account through the service provider application using a third party service provider process. The prior authentication method can include at least one of a billing address verification process, an online authentication process risk based analysis using device information from a user device associated with the current transaction process, and/or an online authentication process challenge process that is used in a username and password login provisioning process, a tokenization process, or an issuer inline provisioning process. In some embodiments, the result of the risk analysis includes a negative verification of the transaction in response to a determination that the risk analysis for the transaction is less than the threshold, or a positive verification of the transaction in response to a determination that the risk analysis for the transaction is greater than the threshold.

Some embodiments of the invention can include an access control server comprising a processor, and a computer readable medium coupled to the processor, the computer readable medium comprising code, executable by the processor to implement a method. The method includes receiving, by the access control server via a directory server from an authentication requestor, an authentication request comprising an account identifier, and information regarding a prior authentication method on the account identifier and a current authentication method for the account identifier associated with a transaction. The method may also include performing, by the access control server, a risk analysis for the transaction based at least in part on the information and a threshold. The method may also include authenticating, by the access control server, the user of the account identifier using the information, the account identifier, and a result of the risk analysis. The method may also include modifying, by the access control server, an authentication response to include an authentication indicator. The method may include transmitting, by the access control server, the authentication response to the authentication requestor.

Some embodiments of the invention are directed to a directory server comprising a processor, and a computer readable medium coupled to the processor, to implement a method. The method may include receiving, by the directory server from an authentication requestor, an authentication request comprising an account identifier, and information regarding a prior authentication method on the account identifier and a current authentication method for the account identifier associated with a transaction, the current authentication method for the account identifier including an issuer signature for the transaction. The method may also include verifying, by the directory server, the issuer signature of the information. The method may also include modifying, by the directory server, an authentication response to include the verification of the issuer signature. The method may include transmitting, by the directory server, the authentication response to the authentication requestor thereby by passing an access control server for the transaction.

Another embodiment of the invention is related to an access control server to perform the above-noted method.

Further details regarding embodiments of the invention can be found in the Detailed Description and the Figures.

DETAILED DESCRIPTION

Figure 1:
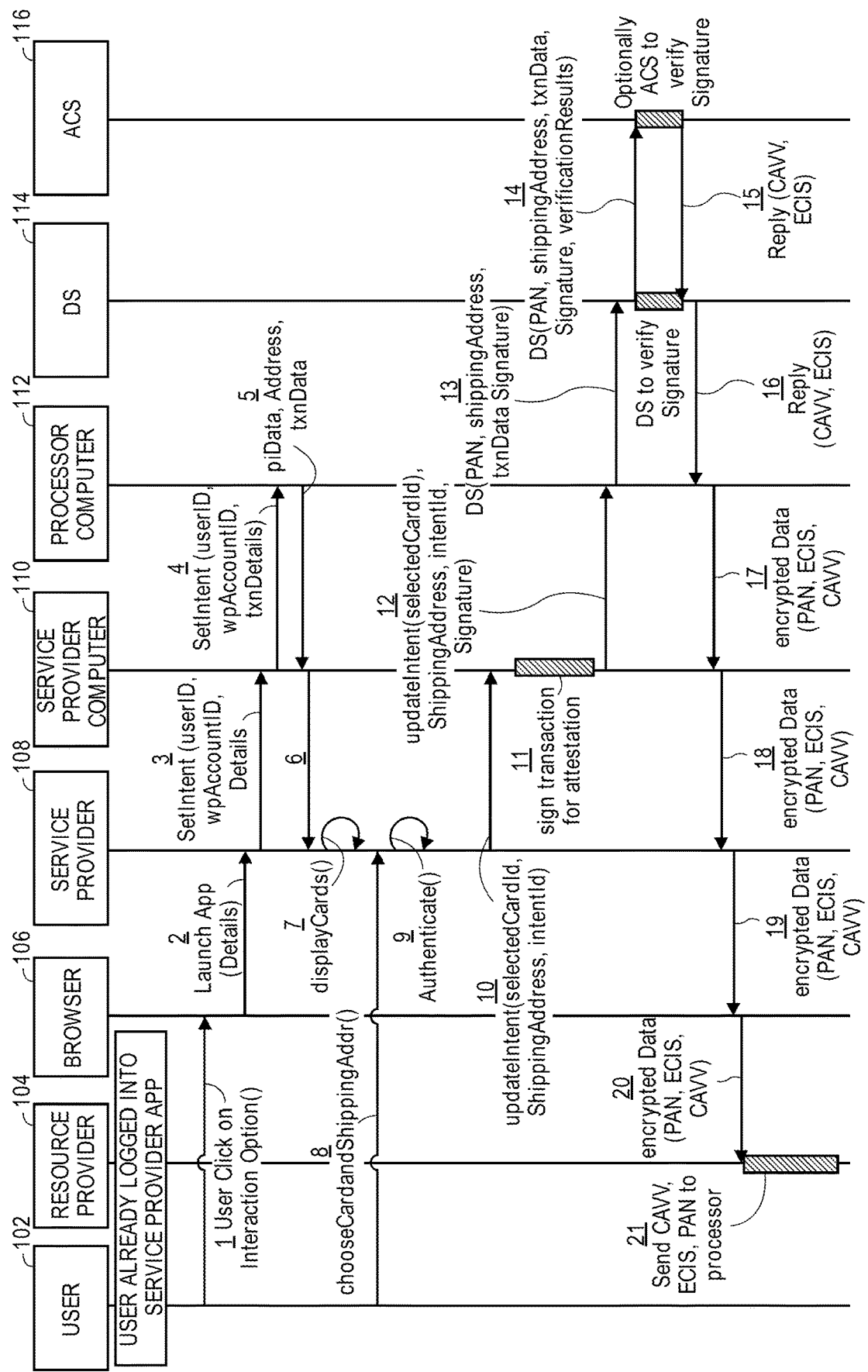
FIG. 1 shows a flow diagram illustrating a method according to an embodiment of the invention.

Prior to discussing embodiments of the invention, some terms can be described in further detail.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "authentication requestor" may be any suitable entity that requests authentication. In some embodiments, a resource provider, a user device, or a service provider application could be authentication requestors.

A "service provider" can be any suitable entity that provides a service. In some embodiments, a "service provider" can be a digital wallet provider, an entity that provides access to a resource such as a location, data, or goods or services, etc.

A "digital wallet" can include an electronic application or device that allows an individual to conduct electronic commerce transactions. A digital wallet may store user profile information, payment credentials, bank account information, one or more digital wallet identifiers, and/or the like, and can be used in a variety of transactions, such as but not limited to e-commerce, social networks, money transfer/personal payments, mobile commerce, proximity payments, gaming, and/or the like for retail purchases, digital goods purchases, utility payments, purchasing games or gaming credits from gaming websites or systems, transferring funds between users, and/or the like. A digital wallet may be designed to streamline the purchase and payment process. A digital wallet may allow the user to load one or more payment cards onto the digital wallet so as to make a payment without having to enter an account number or present a physical card. A digital wallet may also store transaction records (e.g., electronic receipts).

An "access device" may be any suitable device that provides access to a remote system. An access device may also be used for communicating with a resource provider computer, an authentication computer, or any other suitable system. An access device may generally be located in any suitable location, such as at the location of a resource provider or merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, terminals, and the like. An access device may use any suitable contact or contactless mode of operation to send or receive data from, or associated with, a user communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. Other examples of access devices include devices (e.g., locks, gates, access control boxes, etc.) that control physical access to locations (e.g., venues, transit stations, homes, offices, buildings, etc.), as well as software devices that control access to data or information.

An "authorization request message" may be an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "user" may include an individual that operates a user device.

A "user device" may be any suitable device that is operated by a user. Suitable user devices can be portable, and can communicate with external entities such as access devices. Examples of user devices include cards that have data stored on them, mobile phones, laptop computers, transponders, wearable devices such as smart watches, automobiles with remote communication capabilities, access cards, smart media, etc. A payment device may be an example of a user device.

An "authorizing entity" may be an entity that authorizes a request. Examples of an authorizing entity may be an issuer, a governmental agency, a document repository, an access administrator, etc.

An "issuer" may typically refer to a business entity (e.g., a bank) that maintains financial accounts for a user and often issues a credit or debit card to the user. An issuer can include a payment account issuer. The issuer may operate an "authorization computer" to perform the foregoing actions.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

An "access control server" may refer to a server computer that provides authentication services to authenticate a user conducting an online transaction. An access control server may perform the requested authentication services for issuers or other entities, and provide digitally signed responses to entities requesting authentication. An access control server may be shared or used by multiple entities. An entity may also have multiple access control servers, each associated with a different subset of the users.

A "directory server" may refer to a server computer that can be used to route messages in a transaction system. In some embodiments, the messages routed by the directory server may contain enrollment and authentication information between a merchant plug-in (MPI) and an issuer access control server. The directory server can also determine whether an account can utilize the authentication services. In some embodiments, the directory server can be operated by a transaction service provider. According to various embodiments, the directory server may also have the ability to tokenize account data or may de-tokenize tokens.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Details of some embodiments of the present invention will now be described.

Embodiments may utilize unique sets of attributes as additional data in an authentication process in an online transaction. The sets of attributes can assist authorizing entities such as issuers with their decisions during online authentication processes. A first set of attributes may be associated with a requestor prior authentication method. A second set of attributes may be associated with a requestor current authentication method.

The requestor prior authentication method may include a level of verification that was previously performed on a primary account number (PAN) associated with a user. In some embodiments, the requestor prior authentication method may be an authentication of the user and/or a user device prior to an initiation of a transaction to be conducted.

The requestor prior authentication method may keep track of identity and verification (ID&V) performed on an account of the user and may relay that information to an authorizing entity such as an issuer associated with the account. Depending on what type of ID&V was performed in the past, an authorizing entity can assign a confidence level to the current transaction. Table 1, below, lists example verification levels for a requestor prior authentication method. In these examples, the length of the value may be two characters and the format may be a number. However, some embodiments may use more or less than two characters. Also, in some embodiments, the value associated with the verification level may indicate other information. For example, the attributes that have values starting with '8' may be reserved for any suitable implementation.

TABLE 1

Requestor Prior Authentication Method

| Name | Value | Description |
| --- | --- | --- |
| Address Verification System (AVS) Verified | 80 | AVS was performed and passed |
| Online Authentication Process Risk-Based Success | 01 | The account has successfully passed a prior online authentication process risk based assessment |
| Online Authentication Process Challenge Success | 02 | The account has successfully passed a prior online authentication process challenge assessment |
| Tokenization Step-Up | 81 | The account has performed tokenization step-up, where a token was provisioned to the user device and the user of the user device was authenticated. |
| Authorizing Entity Inline Provisioning | 82 | The authorizing entity has authenticated the user and has pushed account information into the service provider application. |

As shown above, the requestor prior authentication method may include AVS, online authentication risk-based success, online authentication process challenge success, tokenization step-up, authorizing entity inline provisioning, etc. In order for the authorizing entity or access control server (ACS) to verify the requestor prior authentication method in real-time or during disputes, the online authentication process requestor can also send a corresponding transaction reference value. The transaction reference value may indicate the transaction associated with the previous authentication method. Certain values can be verified by the ACS in real-time, while others can be cross-referenced with their host system, during reporting or during disputes.

Table 2, below, shows requestor prior authentication method data. In some embodiments, the length of the value of the requestor prior authentication method data may be variable. For example, a first value may be 10 characters and a second value may be 32 characters. In some embodiments, the value may have a maximum number of characters (e.g., 36 characters). In some embodiments, the value may be a string.

TABLE 2

Requestor Prior Authentication Method Data

| Name | Value | Description |
| --- | --- | --- |
| AVS Verified | | Transaction ID returned by the host system during the AVS response. This value can be cross referenced by a host system and ACS |
| Online Authentication Process Risk-Based Success | | ACS transaction ID from a prior successful risk-based assessment |
| Online Authentication Process Challenge Success | | ACS transaction ID from a prior successful challenge assessment |
| Tokenization Step-Up | | Transaction ID for Token Activation Request (TAR). This value can be cross referenced by a host system and ACS |
| Authorizing Entity Inline Provisioning | | Reference ID that was assigned during Inline provisioning |

The second set of attributes, associated with a requestor current authentication method, may be a level of authentication performed on the user during the current transaction. In some embodiments, the requestor current authentication method may include a type of authentication performed on the user during the current transaction.

Table 3, below, shows requestor current authentication method. In some embodiments, the length of the value of the requestor current authentication method data may be two characters. In some embodiments, the length of the value may be greater than or less than 2. The format of the value may be a number.

TABLE 3

Requestor Current Authentication Method

| Name | Value | Description |
| --- | --- | --- |
| Service Provider Application Authorizing Entity Authentication | 80 | Login to the account through the service provider application using authorizing entity authentication (e.g., an online banking password) |
| Service Provider Application Authentication | 81 | Login to the account through service provider application authentication (e.g., a digital wallet provider password) |
| Service Provider Application Third Party Authentication | 82 | Login to the cardholder account through the service provider application using third party service provider (e.g., a third party password) |

The requestor current authentication method data may have a predetermined maximum length (e.g., 2048 bytes). In some embodiments, the online authentication process requestor authentication data may be in any suitable format. The requestor current authentication method data may be a JWS formatted field to supplement the authentication method with data during the authentication process.

FIG. 1 shows a method according to an embodiment of the invention. FIG. 1 includes a user 102, a resource provider 104, a browser 106, a service provider application 108, a service provider computer 110, a processor computer 112 (e.g., an online authentication process server/merchant plug-in (MPI) combination), a directory server 114, and an access control server 116. It should be understood that for simplicity of illustration, a certain number of components are shown in FIG. 1. However, some embodiments may include more than one of each component, and some embodiments may include fewer than or greater than the components specially shown in FIG. 1.

The user 102 may operate a user device (e.g., a computer or mobile phone) which may include the browser 106. In some embodiments, the user device may include the service provider application 108 (e.g., a digital wallet application). The browser 106 and the service provider application 108 may be in operative communication. The service provider application 108 may be in operative communication with the service provider computer 110. The service provider computer 110 may be in operative communication with the processor computer 112 which may be in operative communication with the directory server 114. The directory server 114 may be in operative communication with the access control server 116. In some embodiments, the resource provider 104 may be in operative communication with a payment processor.

The resource provider 104 may operate a merchant computer. The resource provider 104 in FIG. 1 may indicate the merchant computer. The merchant computer may include any suitable computational apparatus. Examples of a merchant computer may include an access device and/or an online merchant computer. In some embodiments, the merchant computer may include a web server computer that hosts one or more websites associated with the merchant. The merchant computer can be configured to send and receive data as part of a transaction verification and authentication process for an online transaction conducted between a user and the merchant. The merchant computer may also be configured to generate or facilitate generation of authorization request messages, and may route the authorization request messages, for example, to the payment processor.

The browser 106 may be a program or application. For example, the browser 106 may be configured to display HTML files to the user 102 via the user device. The browser 106 may be used to navigate the Internet.

The service provider application 108 may be a digital wallet application and can be used by a user associated with the digital wallet application to conduct financial transactions. Digital wallets may also be associated with authorization and completion transactions, including encryption of sensitive payment data and personal user data. The application 108 may reside on the user device used by the user 102, or it may be a Web application run on a Web server computer.

The service provider computer 110 may be a server computer operated by an entity associated with the service provider application 108. In some embodiments, the service provider computer 110 may perform processing for the service provider application 108. In some embodiments, the service provider computer 110 may be a digital wallet server computer, that provides support for a digital wallet application.

The processor computer 112 may be a processing network computer which may be configured to provide authorization services, and clearing and settlement services for payment transactions. A processing network computer may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet. In some embodiments, the processing network computer may forward an authorization request received from a transport computer to the authorizing entity computer via a communication channel. The processing network computer may further forward an authorization response message received from the authorizing entity computer to the transport computer. The processing computer 112 may also operate or integrate with an MPI (merchant plug in).

The directory server 114 can be a server computer configured to route authentication messages from the processor computer 112 to the access control server 116, as well as messages back from access control server 116 to processor computer 112.

The access control server 116 can be a remote server computer configured to conduct remote authentication processing, for example, in response to a transaction. The access control server 116 may comprise a processor and a computer readable medium coupled to the processor. The access control server 116 can be associated with an issuer, which can be a bank that issues and maintains accounts for users. The access control server 116 may validate (or authenticate) account credentials during processing of a transaction. For example, the access control server 116 may verify the account credentials are valid. In some embodiments, the access control server 116 may conduct a risk analysis based on the data received from communication device operated by a user. The data may include communication device data, user identifying data, geolocation data, transaction data, account credentials, and/or other comparable data. The access control server 116 may use this data to determine a risk associated with communication device or risk associated with the account credentials being used for the transaction. In some embodiments, the access control server 116 may determine to verify the user 102 based on the requestor prior authentication method and or the requestor current authentication method.

The access control server 116 may have pre-defined or user-defined risk thresholds. When the risk level is below the risk threshold, the access control server 116 may provide an indication that the user and/or the user device is authenticated and that the transaction may proceed. When the risk level is above the risk threshold, the access control server 116 may provide an indication that the user and/or the user device is not authenticated, and that the transaction should not proceed.

In some embodiments, the authentication scheme may include verification of the user credentials through the issuer ACS (Access Control Server). For example, the issuer ACS service may be part of an authentication protocol such as 3-D secure protocol by Visa™. The ACS may be associated with an issuer that may include registered user account and access information. The ACS can give issuers the ability to authenticate a user during an online purchase, thereby reducing the likelihood of fraudulent use of the user account. For example, the ACS can validate that the user is registered, performs user verification at the time of the transaction, and provides digitally signed responses to the merchants. In some embodiments, the authentication scheme may include verification of the account using a transaction processing network consumer authentication service (e.g., Visa™ Consumer Authentication Service (VCAS)). For example, the VCAS service can authenticate the user on-behalf of the issuer prior to the authorization process.

Before step 1, in FIG. 1, the user 102 may already be logged into the service provider application 108. The user 102 may use the browser 106 to navigate to a website associated with the resource provider 104. The user 102 may select an item or service to purchase. At step 1, the user 102 may click on a service provider application pay option. The service provider application pay option may be displayed on the user device. For example, the service provider application pay option may be a button that the user 102 may select. In some embodiments, the user 102 may be prompted to initiate a transaction in any suitable manner.

At step 2, after receiving input from the user 102, the browser 106 may launch a payment application (e.g., the service provider application 108). The browser 106 may then transmit transaction details to the service provider application 108. The transaction details may include any suitable information. For example, the transaction details may include a transaction amount and a currency code.

At step 3, the service provider application 108 may generate a set intent message including a user ID, a service provider payment account ID, and the transaction details. The service provider application 108 may then transmit the set intent message to the service provider computer 110.

At step 4, after receiving the set intent message from the service provider application 108, the service provider computer 110 may forward the set intent message to the processor computer 112.

At step 5, the processor computer 112 may transmit piData (personal identifiable information) to the service provider computer 110. The piData may include personal information of the user performing the transaction such as a name, an address, and transaction data. In some embodiments, the processor computer 112 may determine the piData, the address, and the transaction data associated with the user ID.

At step 6, after receiving the piData, the address, and the transaction data from the processor computer 112, the service provider computer 110 may forward the piData, the address, and the transaction data to the service provider application 108.

At step 7, after receiving the piData, the address, and the transaction data, the service provider application 108 may display cards or other payment options on a screen of the user device. In some embodiments, the service provider application 108 may also display shipping addresses.

At step 8, the user 102 may select a card and a shipping address. The service provider application 108 may receive a selected card ID and a selected shipping address.

At step 9, after receiving input from the user 102, the service provider application 108 may perform authentication. For example, the service provider application 108 may authenticate the user 102. In some embodiments, this authentication may result in the requestor current authentication method.

At step 10, after authenticating, the service provider application 108 may transmit an update intent message to the service provider computer 110. The update intent message may include the selected card ID, the selected shipping address, and an intent ID.

At step 11, after receiving the update intent message from the service provider application 108, the service provider computer 110 may sign the transaction for attestation, resulting in a service provider signature. The service provider signature and later online authentication process reply can provide secure transaction features such that a resource provider such as a merchant, or fraudulent actor may be prohibited from changing transaction details. For example, if the service provider signature and attestation is performed for a transaction for $100, the merchant conducting the transaction cannot later attempt to update the amount at step 21 when it sends the transaction information including a CAVV (card verification value) and other information to the payment processor, such as by attempting to change the dollar amount to $1000. The transaction details, service provider signature and attestation, and subsequent authentication by the directory server and/or access control server are saved as data fields in the CAVV as described herein. In accordance with some embodiments, the a new value can be set within the CAVV to acknowledge receipt and analysis of the requestor prior authentication method and the requestor current authentication method associated with the transaction details provided by the service provider application that included a set dollar amount.

At step 12, the service provider computer 110 may include a service provider signature into the update intent message. The service provider computer 110 may then transmit the update intent message to the processor computer 112. The update intent message may include the selected card ID, the selected shipping address, the intent ID, and the service provider signature.

At step 13, after receiving the update intent message from the service provider computer 110, the processor computer 112 may generate an online authentication process message. The online authentication process message may include a PAN associated with the selected card ID, the selected shipping address, the transaction data, and the service provider signature. In some embodiments, the processor computer 112 may determine the PAN associated with the selected card ID and/or the selected shipping address. The processor computer 112 may then transmit the online authentication process message to the directory server 114.

At step 14, after receiving the online authentication process message from the processor computer 112, the directory server 114 may verify the service provider signature resulting in verification results. The director server 114 may have a public key or a symmetric key corresponding to a private key or symmetric key held by the service provider computer 108. After verifying the service provider signature, the directory server 114 may transmit the online authentication process message including the PAN, the selected shipping address, the transaction data, the service provider signature, and the verification results to the access control server 116.

At step 15, after receiving the online authentication process message from the directory server 114, the access control server 116 may generate an online authentication process reply message. The online authentication process reply message may include a cardholder authentication verification value (CAVV) and an ECI5. In some embodiments, the ECI5 may be associated with an e-commerce transaction. In some embodiments, the access control server 116 may verify the service provider signature. The access control server 116 may set a value within the CAVV to acknowledge that the access control server 116 has received data from the requestor prior authentication method and the requestor current authentication method. This may signal to a party as to which entity has performed authentication. In some embodiments, issuers may implicitly trust the service provider application and online banking (OLB) passwords and may therefore provide higher authorization rates for when the service provider application and OLB are used.

At step 16, after receiving the online authentication process reply from the access control server 116, the directory server 114 may forward the online authentication process reply to the processor computer 112.

At step 17, after receiving the online authentication process reply from the directory server 114, the processor computer 112 may generate an encrypted payment data message including the PAN, the ECI5, and the CAVV. The encrypted payment data message may be encrypted in any suitable manner. The processor computer 112 may then transmit the encrypted payment data message to the service provider computer 110. The service provider computer 110 may have a corresponding cryptographic key to the cryptographic key that was used by the processor computer 112 to encrypted the payment data in the payment data message.

At step 18, after receiving the encrypted payment data message from the processor computer 112, the service provider computer 110 may forward the encrypted payment data message to the service provider application 108.

At step 19, after receiving the encrypted payment data message from the service provider computer 110, the service provider application 108 may forward the encrypted payment data message to the browser 106.

At step 20, after receiving the encrypted payment data message from the service provider application 108, the browser 106 may forward the encrypted payment data message to the resource provider 104.

At step 21, after receiving the encrypted payment data message from the browser 106, the resource provider 104 may transmit an authorization request message including the CAVV, the ECI5, and the PAN to a payment processor operating the processor computer 112 to authorize the transaction. The authorization request message may pass through a transport computer operated by an acquirer before it is received at the processor computer 112. After the processor computer 112 receives the authorization request message, it may forward it to an authorizing computer operated by an authorizing entity such as an issuer. The authorizing computer may then return an authorization response message back to the processor computer 112. In some embodiments, the resource provider 104 may receive the authorization response message from the processor computer 112 via the transport computer. At the end of the day or at some later time, a clearing and settlement process can take place.

Figure 2:
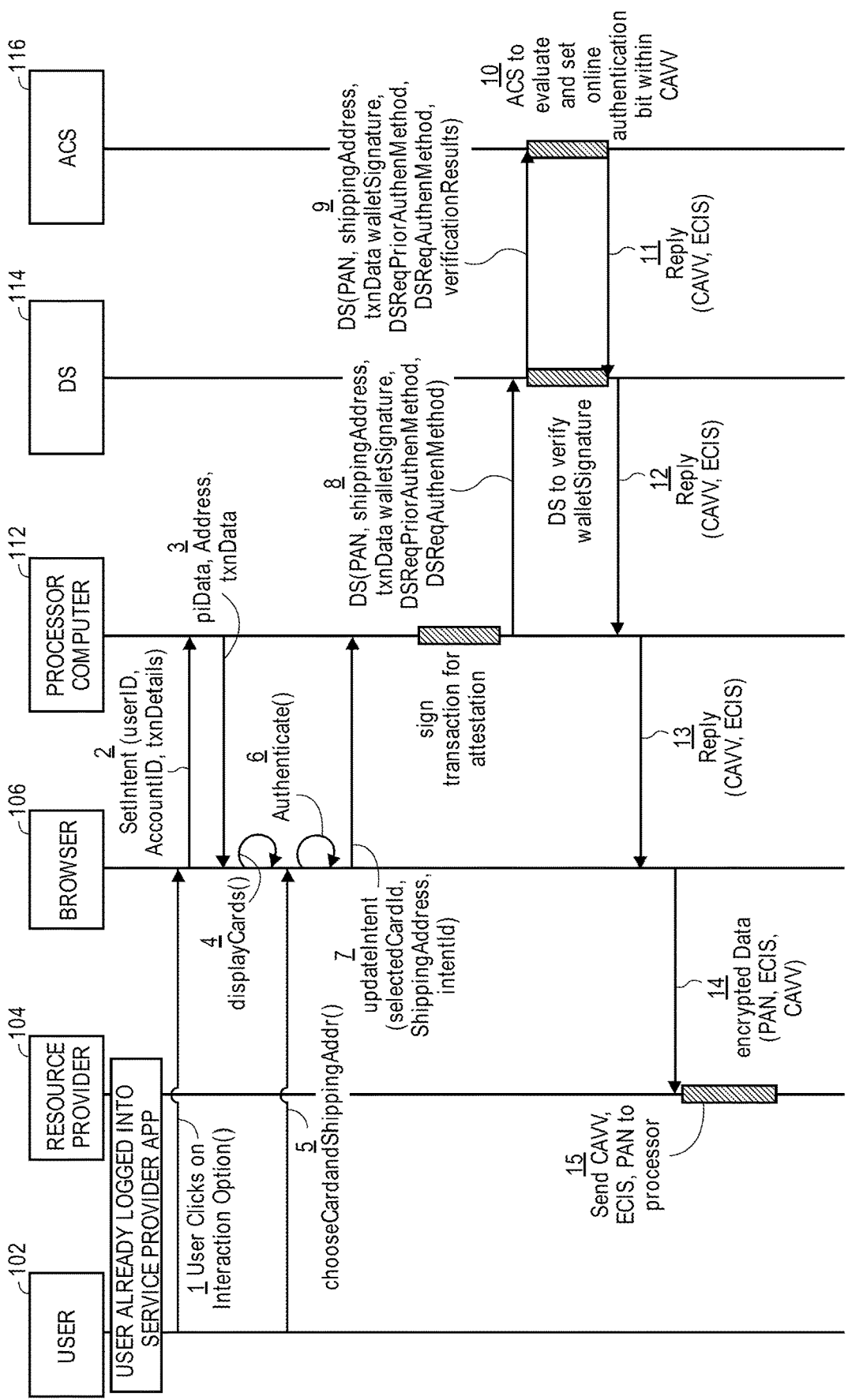
FIG. 2 shows a flow diagram illustrating a method according to an embodiment of the invention.

FIG. 2 shows a method according to an embodiment of the invention. The process flow in FIG. 2 omits the service provider computer 110 shown in FIG. 1.

FIG. 2 includes the user 102, the resource provider 104, the browser 106, the processor computer 112, the directory server 114, and the access control server 116.

Before step 1, the user 102 may already be logged into the service provider application 108. At step 1, the user 102 may select a service provider application pay option.

At step 2, the browser 106 may receive a selection to initiate the service provider application pay option. The browser 106 may generate a set intent message including a user ID, a service provider payment account ID, and transaction details. The browser 106 may transmit the set intent message to the processor computer 112.

At step 3, after receiving the set intent message from the browser 106, the processor computer 112 may transmit piData, an address, and transaction data to the browser 106.

At step 4, the browser 106 may display cards to a screen of the user device. In some embodiments, the browser 106 may also display shipping addresses.

At step 5, the user 102 may select a card and a shipping address.

At step 6, after receiving input from the user 102, the browser 106 may initiate an authentication process. For example, the service provider application 108 may authenticate the user 102.

At step 7, after authenticating, the browser 106 may transmit an update intent message to the processor computer 112. The update intent message may include a selected card ID, a selected shipping address, and an intent ID.

At step 8, the processor computer 112 may wait for the service provider computer 110 to sign the transaction for attestation, resulting in a service provider signature. The processor computer 112 may generate an online authentication process message including a PAN, the selected shipping address, the transaction data, a service provider signature, requestor prior authentication method data (DSReqPriorAuthenMethod), and requestor current authentication method data (DSReqAuthenMethod). The processor computer 112 may transmit the online authentication process message to the directory server 114. For example, the requestor prior authentication method data may include information that indicates that the user 102 previously signed up to use the service provider application through online banking with an authorizing entity, and may have been authenticated using an OLB (online banking) username/password. The requestor current authentication method may include information that indicates that during checkout, that the user clicked on a service provider application button and select to use an authorizing entity password to login. In some embodiments, a requestor prior authentication method may be represented as RequestorPriorAuthenticationMethod=82. A requestor current authentication method may be represented as RequestorAuthenticationMethod=80.

At step 9, after receiving the online authentication process message from the processor computer 112, the directory server 114 may verify the service provider signature. The directory server 114 may then include the verification results into the online authentication process message. The directory server 114 may transmit the online authentication process message to the access control server 116. The access control server 116 may receive, via the directory server 114 from an authentication requestor, an authentication request comprising an account identifier, and information regarding a prior authentication method on the account identifier or a user of the account identifier. The authentication requestor, for example, may be the service provider computer 110 that may be operated by a service provider. The authentication request may be the online authentication process message. The information regarding a prior authentication method on the account identifier or a user of the account identifier may be the requestor prior authentication method.

At step 10, the access control server 116 may evaluate the online authentication process message. The access control server 116 may determine whether or not to authenticate the user and/or the user device based on the requestor prior authentication method and/or the requestor current authentication method. For example, if the requestor prior authentication method=82 and the requestor current authentication method=80, as described above, then the access control server 116 may determine not to further authenticate the user 102. The access control server 116 may determine a confidence level of the likelihood that the user 102 is the correct user and/or that the user device is the correct user device. For example, the confidence level that the transaction is trustworthy may be "very high" for the above example. This may mean that there is no reason to decline the transaction, unless the access control server 116 determines, using other data, that the cardholder has been compromised (e.g., an account takeover). The access control server 116 may set a bit within a CAVV to indicate the determination of the authenticity of the user 102. In some embodiments, the access control server 116 may authenticate the user of the account identifier using the information (e.g., the requestor prior authentication method and/or the requestor current authentication method) and the account identifier.

At step 11, the access control server 116 may generate an online authentication process reply including the CAVV and an ECI5. The access control server 116 may then transmit the online authentication process reply to the directory server 114. In some embodiments, the access control server 116 may transmit an authentication indicator to the authentication requestor. The authentication indicator may be the CAVV. In some embodiments, the authentication requestor may be the processor computer 112.

At step 12, after receiving the online authentication process reply, the directory server 114 may forward the online authentication process reply to the processor computer 112.

At step 13, after receiving the online authentication process reply from the directory server 114, the processor computer 112 may generate encrypted payment data. The encrypted payment data may include the PAN, the ECI5, and the CAVV. The processor computer 112 may then transmit the encrypted payment data to the browser 106. In some embodiments, the encrypted payment data may be encrypted using any suitable method.

At step 14, after receiving the encrypted payment data, the browser 106 may forward the encrypted payment data to the resource provider 104. At step 15, after receiving the encrypted payment data, the resource provider 104 may transmit the CAVV, the ECI5, and the PAN to a payment processor such as the processor computer 112. In some embodiments, the resource provider 104 may decrypt the encrypted payment data. In other embodiments, the resource provider 104 may forward the encrypted payment data to the payment processor. Further payment processing steps are described above in the discussion of step 21 in FIG. 1, and the description is incorporated herein.

Figure 3:
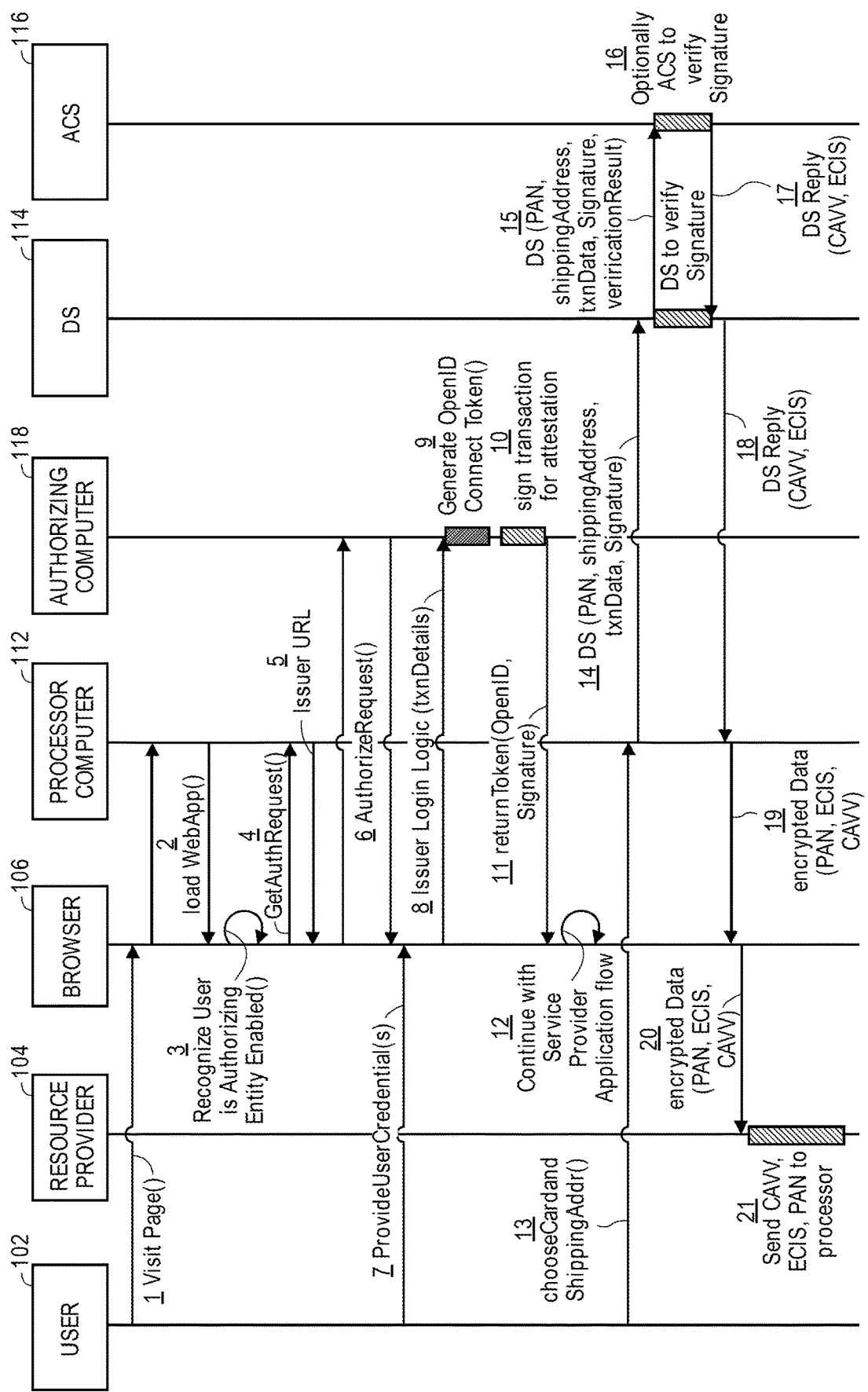
FIG. 3 shows a flow diagram illustrating a method according to an embodiment of the invention.

FIG. 3 shows a method according to an embodiment of the invention. FIG. 3 illustrates an authorizing computer 118 (e.g., an issuer computer), which is not shown in FIG. 1 or 2.

FIG. 3 includes the user 102, the resource provider 104, the browser 106, the processor computer 112, the directory server 114, the access control server 116, and an authorizing computer 118.

The authorizing computer 118 may be a server computer operated by the issuer. In some embodiments, the authorizing computer 118 may be an authorization computer.

At step 1, the user 102 may visit a website of the resource provider 104 via the browser 106. At step 2, the browser 106 may load the service provider web application after communicating with the processor computer 112.

At step 3, the browser 106 may determine whether or not the user 102 is enabled to be authenticated for a service provider application using an authorizing entity. If the user 102 is enabled, then at step 4, the browser 106 may transmit a get authentication request to the processor computer 112.

At step 5, after receiving the get authentication request from the browser 106, the processor computer 112 may transmit an authorizing entity URL to the browser 106.

At step 6, the browser 106 may communicate with the authorizing computer 118. The browser 106 may transmit an authorize request to the authorizing computer 118. The authorizing computer 118 may respond to the authorize request by transmitting a message to the browser 106.

At step 7, the user 102 may enter, or otherwise provide, user credentials to the browser 106. In some embodiments, the browser 106 may prompt the user 102 to input user credentials (e.g., user name and password, biometric information, or other suitable user credential).

At step 8, after receiving user credentials, the browser 106 may transmit an issuer login logic message to the authorizing computer 118. The issuer login logic may include transaction details.

At step 9, after receiving the transaction details, the authorizing computer 118 may generate an OpenID and may connect to a token. At step 10, the authorizing computer 118 may then sign the transaction for attestation, resulting in an authorizing entity (e.g., issuer) signature.

At step 11, the authorizing computer 118 may transmit a return token including the OpenID and the issuer signature to the browser 106.

At step 12, after receiving the return token, the browser 106 may continue with the service provider application flow.

At step 13, the user 102 may select a card and a shipping address for the transaction. The selected card and the selected shipping address may be transmitted to the processor computer 112 in any suitable manner. For example, the selected card and the selected shipping address may be transmitted via the browser 106.

At step 14, after receiving the selected card and the selected shipping address, the processor computer 112 may generate an online authentication process message including a PAN associated with the selected card, the selected shipping address, transaction data, and the issuer signature. The processor computer 112 may then transmit the online authentication process message to the directory server 114.

At step 15, after receiving the online authentication process message from the authorizing computer 118, the directory server 114 may verify the issuer signature resulting in a verification result. The directory server 114 may add the verification result to the online authentication process message which may include the PAN, the selected shipping address, the transaction data, the issuer signature, and the verification result. The directory server 114 may then transmit the online authentication process message to the access control server 116.

At step 16, after receiving the online authentication process message from the directory server 114, the access control server 116 may generate an online authentication process reply including a CAVV and an ECI5. The access control server 116 may determine the CAVV and the ECI5 for the transaction. In some embodiments, the access control server 116 may verify the issuer signature.

At step 17, the access control server 116 may then transmit the online authentication process reply to the directory server 114.

At step 18, after receiving the online authentication process reply from the access control server 116, the directory server 114 may forward the online authentication process reply to the processor computer 112.

At step 19, after receiving the online authentication process reply from the directory server 114, the processor computer 112 may generate an encrypted payment data message including the PAN, the ECI5, and the CAVV. The processor computer 112 may then transmit the encrypted payment data to the browser 106.

At step 20, after receiving the encrypted payment data message from the processor computer 112, the browser 106 may forward the encrypted payment data message to the resource provider 104.

At step 21, after receiving the encrypted payment data message from the browser 106, the merchant may transmit the CAVV, the ECI5, and the PAN to the payment processor. Further payment processing steps are described above in the discussion of step 21 in FIG. 1, and the description is incorporated herein.

Table 4, below, shows example use cases along with the associated confidence level that the access control server 116 may determine. Also shown are the attributes for that use case.

TABLE 4

Example Use Cases

| Use Case | Confidence Level | Attributes |
| --- | --- | --- |
| The user may sign up with a service provider application such as a digital wallet through Online Banking and can authenticate using an OLB username/password:<br>The user may sign-in via their online banking portal<br>The user may be presented the option to sign up with the service provider application<br>The card and account information is inline provisioned into the service provider application<br>During checkout, the user clicks on a service provider application button and chooses to use an online banking password to login | Very high: There may be no reason to decline unless it is suspected that the user has been compromised (e.g., account takeover). | Requestor = Service Provider ID<br>Requestor Prior Authentication Method = 82<br>Requestor Current Authentication Method = 80 |
| The user may sign up with a service provider application through Online Banking and authenticate using the service provider application:<br>The user may sign-in to their online banking portal<br>The user may be presented with the option to sign up with the service provider application and the user agrees<br>The account is inline provisioned into the service provider application<br>During checkout, the user clicks on the service provider application button and chooses to use the service provider application username/password | High: The authorizing entity can trust that service provider application has a good authentication process (e.g., password, stay signed in). | Requestor = service provider application ID<br>Requestor Prior Authentication Method = 82<br>Requestor Authentication Method = 81 |
| The user may sign up with the service provider application through the user device based a third party service such as a third party wallet, and may authenticate through the third party wallet:<br>The user may sign up with the device based service provider application, and add a card to the account<br>User authenticates themselves during a tokenization step-up process<br>The user also agrees to sign up to with the service provider application or links to an existing service provider application account<br>A token/PAN is provisioned into service provider application<br>During checkout, user clicks on service provider application button and chooses to use a third party wallet fingerprint scanner to authenticate. | Very High: There may be no reason to decline. The issuer authenticates user during token provisioning and subsequent transactions are authenticated by a biometric scanner. Otherwise it would be high, if the user chooses to use their service provider application password. | Requestor = service provider application ID<br>Requestor Prior Authentication Method = 82<br>Requestor Current Authentication Method = 82 |
| The user may sign up with a service provider application and a online authentication process challenge for the first transaction<br>The user may sign up with service provider application and add a card through manual entry<br>During the first transaction or during the add card process, an online challenge can be presented to cardholder<br>During checkout, user clicks on a service provider application button and chooses to use a service provider application username/password | High: The issuer has authenticated the user during the initial transaction, and subsequent transactions are authenticated by service provider application. | Requestor = service provider application ID<br>Requestor Prior Authentication Method = 02<br>Requestor Current Authentication Method = 81 |

TABLE 4-continued

Example Use Cases

| Use Case | Confidence Level | Attributes |
| --- | --- | --- |
| The user may sign up to a service provider application and an online authentication process risk-base for the first and subsequent transactions The user may sign up with service provider application and add a card through manual entry During the first transaction and any subsequent transaction, an online authentication process such as 3D secure can perform a risk based authentication During checkout, the user clicks on a service provider application button and then chooses to use a service provider application username/password | Medium high: The issuer has provided a positive 3DS response to the most recent prior transaction. | Requestor = service provider application ID Requestor Prior Authentication Method = 01 Requestor Current Authentication Method = 81 |
| The user may sign up with a service provider application and perform AVS The user may sign up with a service provider application and add a card through manual entry During the add card process, the system performed AVS to ensure that card is valid and to ensure that the user has billing address of cardholder During checkout, the user clicks on service provider application button and chooses to use the service provider application username/password | Medium low: The issuer has provided a positive response to AVS request. | Requestor = service provider application ID Requestor Prior Authentication Method = 81 Requestor Current Authentication Method = 81 |

Payload attributes, included in the messages above, may include a timestamp, a cardholder verification method (CVM), a device ID, a service provider ID, an account ID, a merchant name, a transaction amount, a currency code, a currency exponent, a digital signature, an algorithm, and/or an X509 certificate. In some embodiments, some of the payload attributes may be provided. In other embodiments, all of the payload attributes may be provided.

The timestamp may be a date and time of the authentication of the user. In some embodiments, the timestamp may be in UTC. The length of the timestamp may be 14 characters. In some embodiments, the timestamp may have any suitable number of characters. The timestamp may be in the format of YYYYMMDDHHMMSS.

The CVM may be an enumeration of different cardholder verification methods. In some embodiments, the CVM may have a length of 2 characters. In some embodiments, any suitable length may be used. For example, a CVM for using a passcode may be 0x01=Passcode. Other examples include: 0x02=Pattern, 0xB0=Biometrics: Fingerprint, 0xB1=Biometrics: Iris, 0xB2=Biometrics: retina, 0xB3=Biometrics: facial, 0xB4=Biometrics: voice, and 0xBF=Biometrics: other.

The device ID may be an identifier associated with a device. The device ID may be conditional to device bound tokens and may be optional for all others. The device ID may have a variable length and may be a string. In some embodiments, the device ID may have a maximum number of characters (e.g. 24 characters).

The service provider ID may be an identifier associated with a service provider. The service provider may be an authenticator. The service provider ID may be conditional to device bound tokens and may be optional for all others. In some embodiments, the length of the service provider ID may be variable. In other embodiments, the length of the service provider ID may have a maximum length (e.g., 36 characters).

The account ID may be an identifier associated with an account. The account ID may have a variable length. In some embodiments, the account ID may have a maximum length (e.g. 24 characters).

The merchant name may be a name associated with a merchant. The merchant name may have a variable length. In some embodiments, the merchant name may have a maximum length (e.g., 24 characters).

The transaction amount may be an amount associated with the transaction. The transaction amount may have a variable length. In some embodiments, the transaction amount may have a maximum length (e.g., 48 characters). The transaction amount may be a number.

The currency code may be a code associated with the currency used in the transaction. The currency code may have a variable length. In some embodiments, the currency code may have a maximum length (e.g., 3 characters). The format of the currency code may be in ISO 4217.

The currency exponent may be a code associated with the currency used in the transaction. The currency exponent may have a variable length. In some embodiments, the currency exponent may have a maximum length (e.g., 1 character). The format of the currency code may be in ISO 4217.

The digital signature may be a mathematical scheme for demonstrating the authenticity of digital messages or documents. A valid digital signature may indicate to a third party that the message was created by a known sender, that the sender cannot deny having send the message, and that the message was not altered in transit. The digital signature may have a variable length. In some embodiments, the digital signature may have a maximum length (e.g., 64 bytes).

The algorithm may be an algorithm relating to encryption. For example, the algorithm may be ES256-ECDSA using P-256 and SHA-256. In some embodiments, the algorithm may be ES384-ECDSA using P-384 and SHA-384. In other embodiments, the algorithm may be ES512-ECDSA using P-521 and SHA-512. In yet other embodiments, the algorithm may be PS256-RSASSA-PSS using SHA-256 and MGF1 with SHA-256.

The X509 certificate may be a standard that defines the format of public key certificates. In some embodiments, the X509 certificate may be used outside of the JWS structure. The X509 certificate may have a variable length. In some embodiments, the X509 certificate may have a maximum length (e.g., 1024 bytes).

In some embodiments, the total maximum size of all fields may be: 14 (timestamp)+2(CVM)+24(Device ID)+36 (Wallet ID)+24 (Account ID)+24 (Merchant)+48 (Amount)+3 (Currency)+1 (Exponent)+64 (Signature)+1024 (Cert) =1264 bytes.

Figure 4:
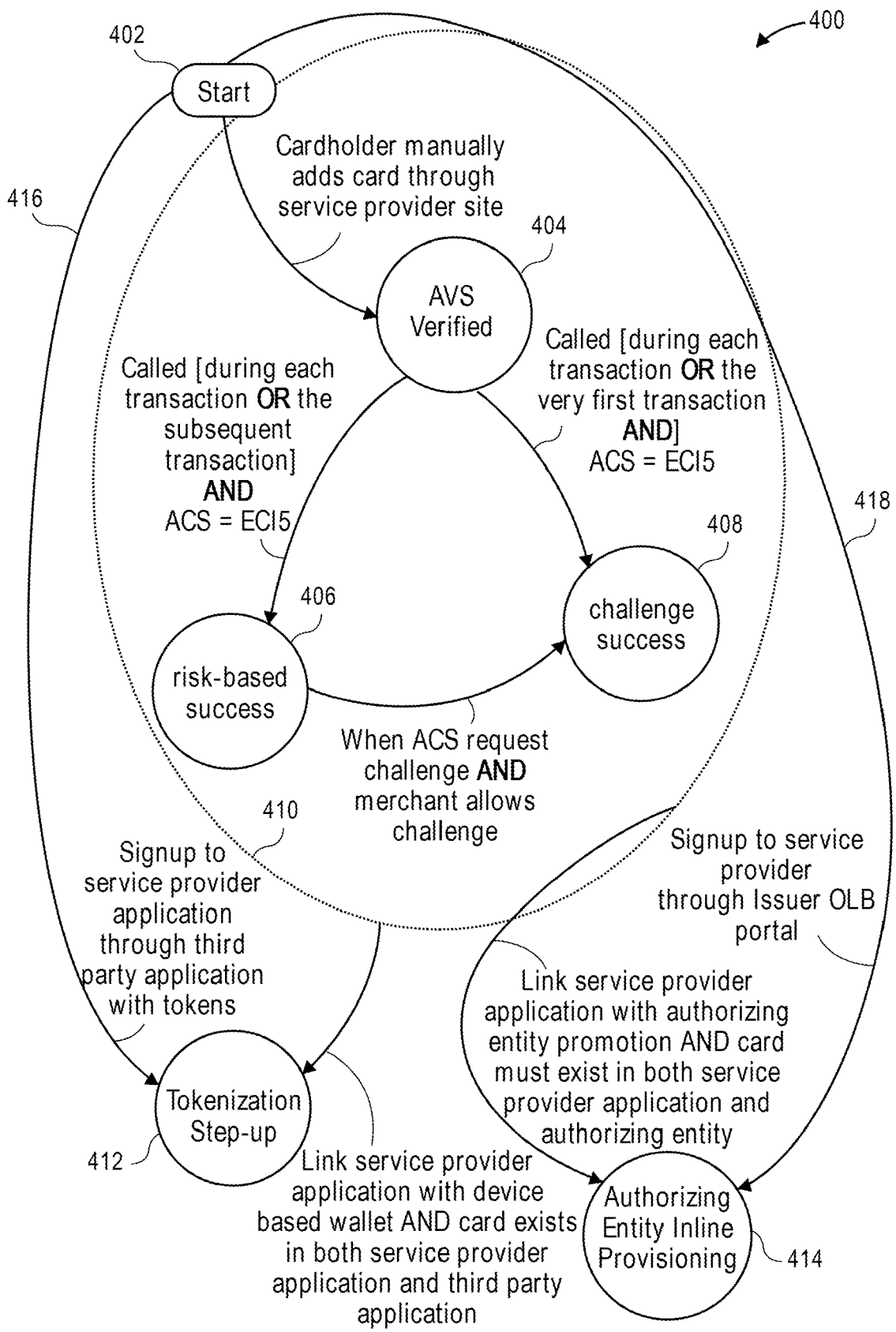
FIG. 4 shows example state transition on a service provider application according to an embodiment of the invention.

FIG. 4 shows example state transition on a service provider application according to an embodiment of the invention. The state transition 400 includes a flow starting at 402 where a user may perform one or more pre or prior authentication methods for an account or account identifier which is eventually relayed to an issuer. Based on the method of pre or prior authentication method used to verify a user an issuer can assign a confidence level to a transaction. In the state transition 400, a user may manually verify themselves with AVS verified by verifying an address with a the service provider application site at 404. A user may upgrade or otherwise change their prior authentication method at any time which would be reflected in subsequent authentication messages between the service provider application of the user device to the access control server and/or directory server and issuer at the time of a transaction. For example, a user may change their prior authentication method from AVS verified 404 to either online authentication process risk-based success 406 or online authentication process challenge success 408.

In embodiments, the circle at 410 of FIG. 4 represents the state transition from the low to medium confidence level prior authentication methods to the high confidence level prior authentication methods such as tokenization step-up 412 or authorizing entity inline provisioning 414. The state transition of FIG. 4 also illustrates a state transition or initial state transition to the higher level confidence prior authentication methods 412 and 414 via lines 416 and 418. The lines 416 and 418 represent a transition to a higher form of prior authentication methods for a user to engage in without having to perform any of the other processes (404-408). In accordance with at least one embodiment, a user may state transition from a higher-degree confidence authentication process to a lesser-degree confidence authentication process (e.g., from Tokenization step-up to AVS verified). In such cases, the online authentication process Requestor Prior Authentication Method would be updated and the appropriate attribute would reflect such an update which may affect subsequent transaction processes for the user or account identifier.

Figure 5A:
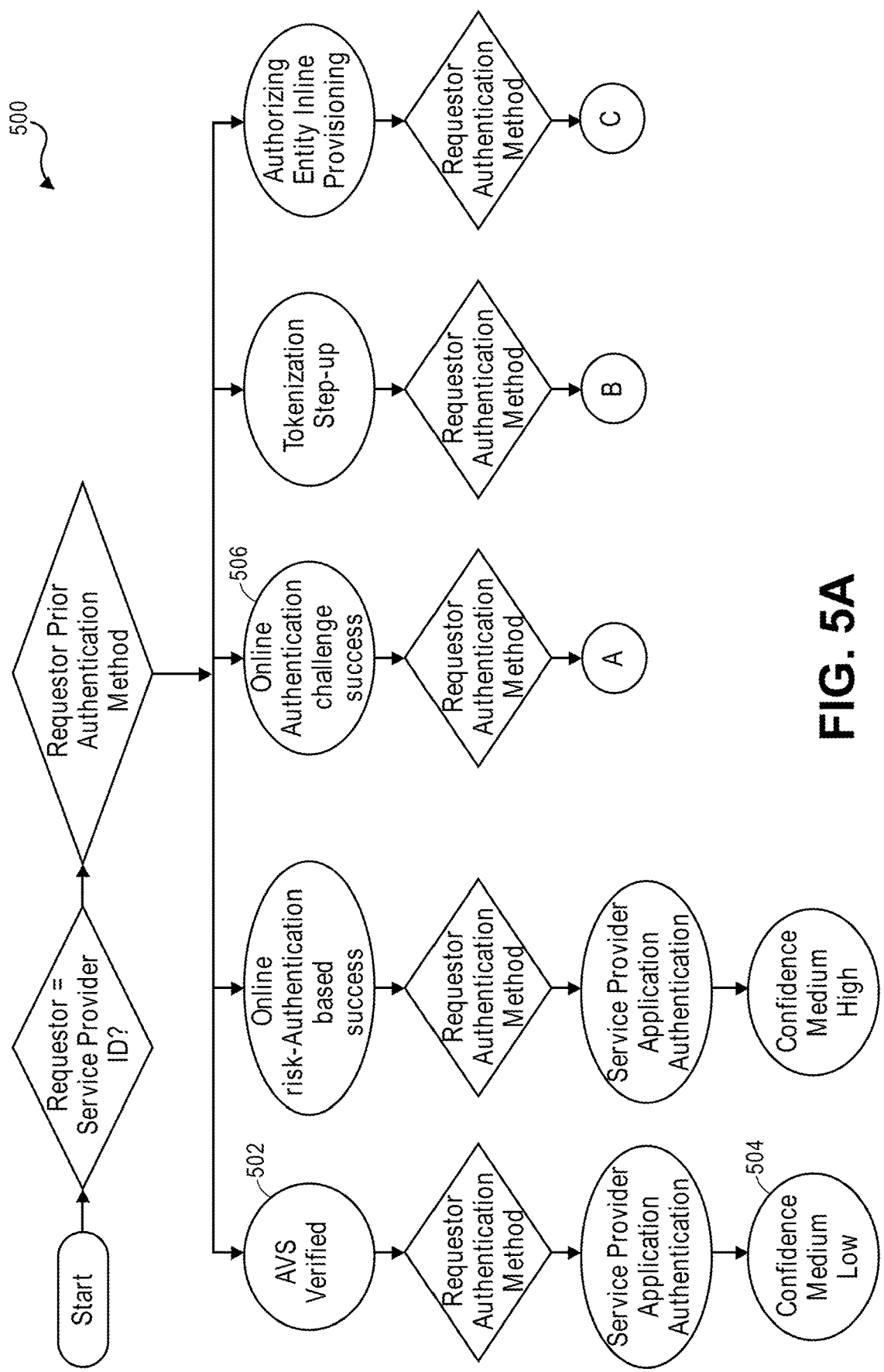
FIGS. 5A and 5B show an example access control server logic according to an embodiment of the invention.
Figure 5B:
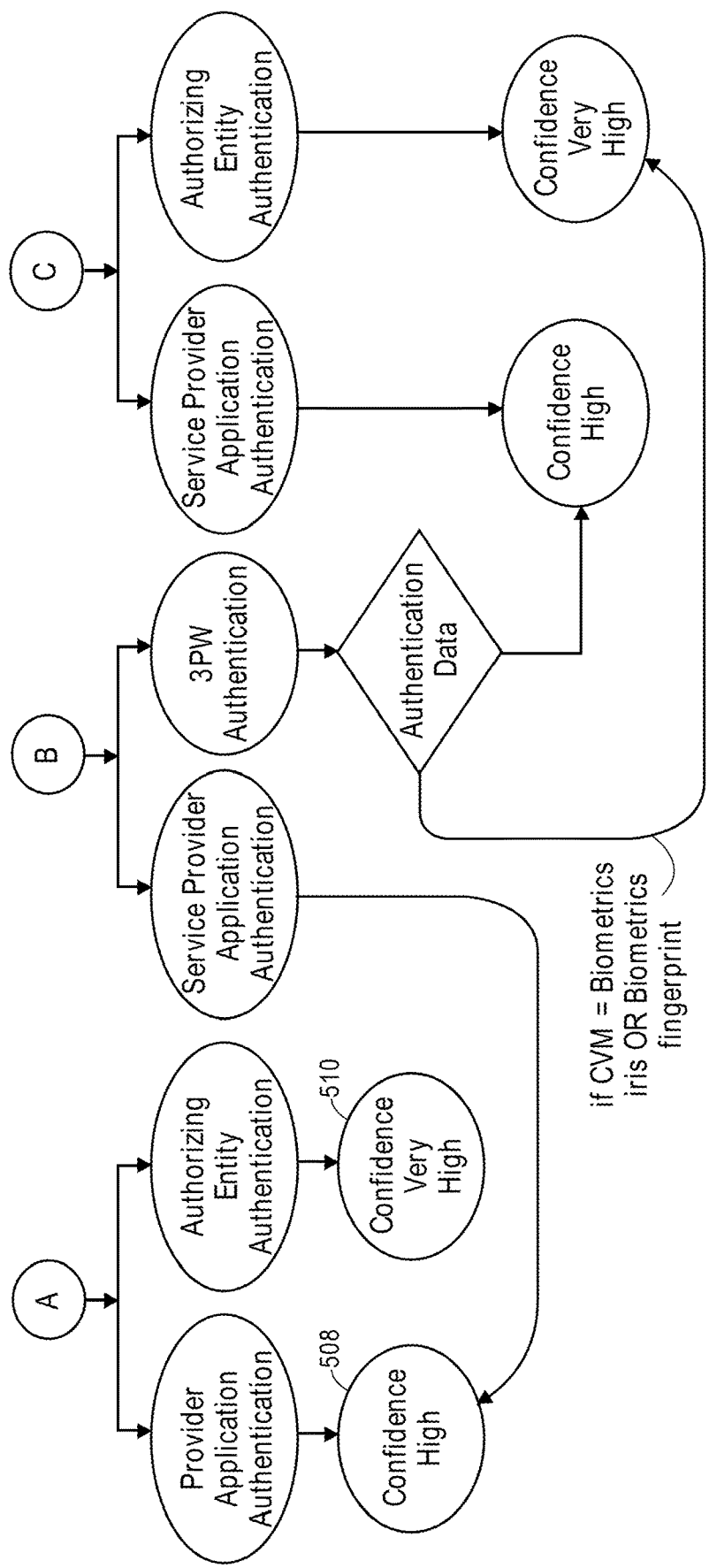

FIGS. 5A and 5B show example access control server logic according to an embodiment of the invention. The access control server logic 500 of FIGS. 5A and 5B includes a visual representation of the use cases described above with reference to Table 4. For example, the logic flow 500 that includes AVS verified 502 results in a confidence medium low 504 that results in online authentication process Requestor Prior Authentication Method being set to a data value "81" and the online authentication process Requestor Current Authentication Method being set to the data value "81" for the authentication message or online authentication process reply steps 14 and 15 of FIG. 1. Other logic flows include in logic flow 500, such as online authentication process challenge success 506 may result in a high confidence 508 or very high confidence 510 based on whether the account was authenticated using the service provider application authentication or issuer authentication.

The access control servers and/or directory servers that are described above, can be configured to implement a method and/or process for authenticating transactions, in accordance with embodiments of the invention. The access control server and/or directory server and elements described herein with reference to FIGS. 1-5A and 5B may operate one or more computer apparatuses to facilitate the functions described herein. Access control servers and directory servers may each comprises a processor and a computer readable medium comprising code, executable by the processor, for implementing any of the methods described herein.

Embodiments of the invention provide for a number of advantages. A first advantage is that the access control server 116 may determine not to perform additional authentication of a user, thus saving resources rather than performing redundant authentications. Additionally, the access control server 116 may receive additional information which may allow it to make more accurate determination about authenticity of a user over prior methods. Embodiments of the invention, allow for the access control server 116 to receive this additional information without receiving massive amounts of data that slow down the system. For example, in some embodiments, the total maximum size of all fields may be 1264 bytes. In conventional systems, the access control server 116 may need to request or otherwise obtain hundreds of data points to perform a similar risk analysis and verification process. In the current embodiments of invention, the access control server 116 can perform the risk analysis and verification process by receiving the requestor prior authentication method and the requestor current authentication method which are represented by a small data value. Moreover, the result of such an analysis can be transmitted and communicated by setting a value within the CAVV to communicate to issuers that the verification process using the above data points has been performed thus improving the conversion rate of transactions that are trusted by issuers. As the data being transmitted to represent the requestor prior authentication method and requestor current authentication method is performed by updating attribute values the system architecture of the payment transaction processing does not need to alter or update to achieve the desired result thereby increasing the likelihood of adoption by participants such as merchants.

Embodiments of the invention also improve upon conventional systems that might only use an issuer based password to authenticate a user in a transaction. For example, if an unauthorized person steals the user's issuer password and attempts to conduct a transaction, other data, such as prior authentication method information (indicating a high likelihood of fraud) may be used by the access control server in embodiments of the invention to possibly score a transaction as being risky, even though the purported user has supplied the correct issuer password. Thus, embodiments of the invention can identify potentially fraudulent transactions that might not be detected using conventional systems.

The above description is illustrative and is not restrictive. Many variations of the various embodiments may become apparent to those skilled in the art upon review of the disclosure. The scope of the invention may, therefore, be determined not with reference to the above description, but instead may be determined with reference to the pending claims along with their full scope or equivalents.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

It may be understood that some embodiments as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A computer-implemented method comprising:
   receiving, by an access control server via a directory server from an authentication requestor, an authentication process message associated with an authentication request for a transaction initiated by a user, wherein the authentication process message comprises an account identifier of the user, a first value associated with a prior authentication method performed on the account identifier and a second value associated with a current authentication method performed on the account identifier associated with the transaction, wherein the first value of the prior authentication method on the account identifier and the second value of the current authentication method for the account identifier are appended to the authentication process message and are associated with types of authentication provided by a processing network;
   performing, by the access control server, a risk analysis for the transaction based at least in part on the first value, the second value and a threshold, wherein performing the risk analysis of the transaction further comprising determining a risk level of the transaction;
   determining, by the access control server, whether the user is to be authenticated by comparing the risk level of the transaction to the threshold;
   based on the determining that the user is to be authenticated, authenticating, by the access control server, the user using the first and second values and the account identifier;
   generating, by the access control server, an authentication response for the transaction;
   based on the authentication and the determined risk level, modifying, by the access control server, the authentication response to include an authentication indicator by setting a bit of the authentication indicator in the authentication response, wherein the bit comprises a third value associated with a the determination of the authenticity of the user for the transaction; and
   transmitting, by the access control server, the modified authentication response comprising the third value of the authentication indicator to the authentication requestor, wherein the third value of the authentication indicator is used by an authorizing entity to decide whether to authorize the transaction.

2. The computer-implemented method of claim 1, wherein the authentication process message further comprises transaction data for the transaction and personal information for the user associated with the transaction.

3. The computer-implemented method of claim 1, wherein a user device of the user comprises a service provider application associated with the account identifier, the method further comprises:
   generating, by the user device via the service provider application, a set intent message that includes a user identifier, a service provider payment account identifier, and transaction data for the transaction.

4. The computer-implemented method of claim 3, further comprising:
   generating, by a service provider computer associated with the service provider application, an attestation signature for the transaction based at least in part on input provided by the user device of the user associated with the transaction.

5. The computer-implemented method of claim 1, wherein the current authentication method for the account identifier associated with the transaction is performed by a service provider application associated with the account identifier and the transaction.

6. The computer-implemented method of claim 1, wherein the current authentication method includes at least one of a first login to an account using an authorizing entity authentication process, a second login to the account through a service provider application authentication process, or a third login to the account using a third party authentication process.

7. The computer-implemented method of claim 1, wherein the prior authentication method includes at least one of a billing address verification process, an online authentication process risk based analysis using device information from a user device associated with the transaction, an online authentication process challenge process that includes a username and password login provisioning, a tokenization process, or an issuer inline provisioning process.

8. The computer-implemented method of claim 1, wherein the determining the risk level of the transaction comprises determining a negative verification of the transaction in response to a determination that the risk analysis for the transaction is less than the threshold, or a positive verification of the transaction in response to a determination that the risk analysis for the transaction is greater than the threshold.

9. An access control server comprising:
a processor; and
a non-transitory computer readable medium coupled to the processor, the non-transitory computer readable medium comprising code, executable by the processor, to cause the process to perform steps comprising:
receiving, via a directory server from an authentication requestor, an authentication process message associated with an authentication request for a transaction initiated by a user, wherein the authentication process message comprises an account identifier of the user, a first value associated with a prior authentication method performed on the account identifier and a second value associated with a current authentication method performed on the account identifier associated with the transaction, wherein the first value of the prior authentication method on the account identifier and the second value of the current authentication method for the account identifier are appended to the authentication process message and are associated with types of authentication provided by a processing network,
performing a risk analysis for the transaction based at least in part on the first value, the second value and a threshold, wherein performing the risk analysis of the transaction further comprising determining a risk level of the transaction;
determining whether the user is to be authenticated by comparing the risk level of the transaction to the threshold;
based on the determining that the user is to be authenticated, authenticating the user using the first and second values and the account identifier;
generating an authentication response for the transaction;
based on the authentication and the determined risk level, modifying the authentication response to include an authentication indicator by setting a bit of the authentication indicator in the authentication response, wherein the bit comprises a third value associated with the determination of the authenticity of the user for the transaction; and
transmitting the modified authentication response comprising the third value of the authentication indicator to the authentication requestor, wherein the third value of the authentication indicator is used by an authorizing entity to decide whether to authorize the transaction.

10. The access control server of claim 9, wherein the authentication process message further comprises transaction data for the transaction and personal information for the user associated with the transaction.

11. The access control server of claim 9, wherein the authentication method includes at least one of a first login to an account using an authorizing entity authentication process, a second login to the account through a service provider application authentication process, or a third login to the account using a third party authentication process.

12. The access control server of claim 9, wherein the requestor prior authentication method includes at least one of a billing address verification process, an online authentication process risk based analysis using device information from a user device associated with the transaction, an online authentication process challenge process that includes a username and password login provisioning, a tokenization process, or an issuer inline provisioning process.

13. The access control server of claim 9, wherein the determining the risk level of the transaction comprises determining a negative verification of the transaction in response to a determination that the risk analysis for the transaction is less than the threshold, or a positive verification of the transaction in response to a determination that the risk analysis for the transaction is greater than the threshold.

* * * * *

UNITED STATES PATENT AND TRADEMARK OFFICE
CERTIFICATE OF CORRECTION

| | | |
|---|---|---|
| PATENT NO. | : 11,574,310 B2 | Page 1 of 1 |
| APPLICATION NO. | : 17/040944 | |
| DATED | : February 7, 2023 | |
| INVENTOR(S) | : Simon Law | |

It is certified that error appears in the above-identified patent and that said Letters Patent is hereby corrected as shown below:

On the Title Page

Item (57), in the Abstract, Line 2, please delete "sewer" and insert -- sever -- in both instances; and On page two, Item (57), in the Abstract, Line 1, please delete "sewer" and insert -- sever --.

In the Claims

Column 26, Line 23, Claim 12, please delete "requestor".

Signed and Sealed this
Nineteenth Day of September, 2023

*Katherine Kelly Vidal*

Katherine Kelly Vidal
*Director of the United States Patent and Trademark Office*